United States Patent

[11] 3,588,433

| [72] | Inventors | Cecil Bailey<br>Woodlyn;<br>Oscar C. Frederick, Springfield,<br>both of Pa. |
|---|---|---|
| [21] | Appl. No. | 731,466 |
| [22] | Filed | May 23, 1968 |
| [45] | Patented | June 28, 1971 |
| [73] | Assignee | General Electric Company |

[54] ARCING CONTACT STRUCTURE AND METHOD OF MAKING SAME
5 Claims, 4 Drawing Figs.

[52] U.S. Cl. .................................................. 219/76, 219/131
[51] Int. Cl. ...................................................... B23k 9/04, B23k 9/00
[50] Field of Search ............................................ 219/76, 121 (P), 69 (E)

[56] References Cited
UNITED STATES PATENTS

| 3,016,447 | 1/1962 | Gage et al. ................. | 219/76 |
| 3,071,490 | 1/1963 | Pevar .......................... | 117/50 |
| 3,075,066 | 1/1963 | Yenni et al. .................. | 219/76 |
| 3,179,783 | 4/1965 | Johnson ....................... | 219/76 |
| 3,244,852 | 4/1966 | Herterick .................... | 219/69E |

*Primary Examiner*—J. V. Truhe
*Assistant Examiner*—L. H. Bender
*Attorneys*—J. Wesley Haubner, William Freedman, Melvin M. Goldenberg, Frank L. Neuhauser and Oscar B. Waddell

ABSTRACT: Discloses a refractory metal arcing contact and a method for making it and for joining it to connection metal support. Refractory metal is plasma-arc sprayed onto the roughened surface of the support to form a porous, refractory metal coating interlocking with the surface. Then molten, high conductivity metal is infiltrated into the coating to fill its pores, after which the infiltrant is solidified in the pores.

PATENTED JUN28 1971 3,588,433

INVENTORS:
CECIL BAILEY,
OSCAR C. FREDERICK,

BY William Freedman
ATTORNEY

ARCING CONTACT STRUCTURE AND METHOD OF MAKING SAME

This invention relates to contact structure for an arcing device such as an electric circuit breaker and, more particularly, relates to the type of contact structure which comprises a refractory metal matrix impregnated with a high conductivity metal. The invention also relates to a method of making such contact structure.

The usual method of making such contact or electrodes is to first form a porous body of the approximate shape desired by pressing powdered refractory metal, such as tungsten, under high pressure in a mold of the desired shape. The resulting body is then heated to a high temperature to sinter the refractory particles together, after which it is suitably impregnated with the high conductivity metal.

Following these forming operations, the electrode body must be attached to a suitable support, usually by brazing. The usual first step in the attaching process is to machine the mating services of the electrode and the support to produce a suitable fit for brazing. The machining must be done to close tolerances on both the electrode and the support.

The electrode surface is then prepared for brazing by applying a coating of brazing alloy, usually in a reducing atmosphere furnace. Then the actual brazing operation is performed, after which a suitable machining operation is performed to impart final dimensions to the electrode and to remove excess brazing alloy.

It is evident from the above that this overall process is quite involved and expensive. This is particularly the case when the electrodes are large or of an odd shape, since specially shaped molds and large presses are required and since machining the electrode and the support to close tolerances is time consuming and expensive. Moreover, the electrode is joined to the support by a low melting temperature brazing alloy, and such joints are disadvantageous for various reasons in those applications where the electrode is exposed to high current arcing.

An object of our invention is to form arcing contacts for a circuit breaker by a process in which we eliminate the need for most of the above-described pressing, machining, and brazing operations.

Another object is to provide a method of making arcing contacts which readily lends itself to the formation of arcing contacts of odd shape without the need for special presses and for expensive machining operations.

Another object is to join the arcing contact to a suitable metal support without reliance upon a low melting temperature brazing alloy.

In one embodiment of our invention, we form the arcing contact structure by first roughening the surface of a suitable metal support. We then plasma arc spray the surface with a refractory metal to form a porous, refractory metal coating interlocked with the surface. We then raise the temperature of the porous coating to a predetermined level and infiltrate the coating with a molten high conductivity metal, thereby filling the pores of the coating with said molten metal. The coating is then cooled, causing the high conductivity metal to solidify in said pores.

For a better understanding of the invention, reference may be had to the following description taken in conjunction with the accompanying drawing, wherein.

Figure 1:
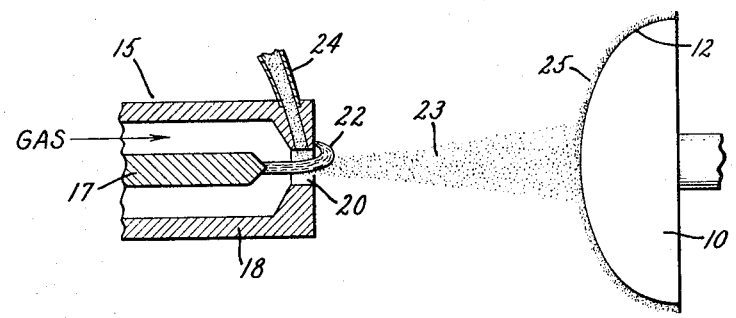
FIG. 1 shows one step in the process of making our electrode structure.

Referring now to FIG. 1, there is shown a conductive electrode support 10 having a generally hemispherical surface 12. To this surface it is desired to join an arc-resistant electrode of a material comprising a refractory metal. A material commonly used for such arcing electrodes is tungsten impregnated with a high conductivity metal such as copper or silver. A suitable material for the support 10 is stainless steel.

We form the electrode and join it to the support 10 by a plasma arc spraying process. Guns for plasma arc spraying are commercially available and are generally of the form illustrated at 15 in FIG. 1. The illustrated gun 15 comprises a thoriated tungsten cathode 17 of rod form and a tubular copper anode 18 surrounding the cathode 17 and forming a nozzle 20 at its right-hand end. Between anode 17 and cathode 18 a high current electric arc, depicted at 22, is formed. A suitable gas such as argon is passed through the nozzle 20 and the arc 22, where it ionizes to form a stream 23 of extremely hot plasma. Powder is fed through a passage 24 into the arc plasma stream, where it is melted and converted into atomized droplets of molten material, which are ejected through the nozzle at high velocity in the plasma stream. The plasma stream containing the molten droplets is projected onto the surface being coated, and upon striking the surface, the molten particles flatten and freeze into an adherent coating.

Figure 2:
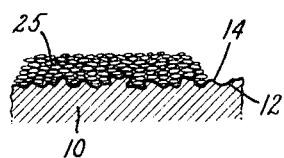
FIG. 2 is an enlarged simplified representation of the microstructure of the electrode.

In the illustrated embodiment of the invention, we feed powdered tungsten through the passage 24 and project the plasma stream 23 containing the molten tungsten particles onto the surface 12. The coating formed by the tungsten particles upon freezing is indicated at 25 in FIGS. 1 and 2. FIG. 2 is an enlarged sectional view, somewhat schematic, of the microstructure of the coating, showing the flattened tungsten particles interlocking with each other.

Before the above-described plasma arc spraying process is begun, the surface 12 of the electrode support 10 is prepared by subjecting it to a roughening operation, which is performed, preferably, by grit blasting in a conventional manner. This not only roughens but also cleans the surface.

Assuming that the surface 12 is of stainless steel, the next step is to apply a thin layer 14 of copper to the roughened surface. This layer of copper is applied by brushing onto the roughened surface a small amount of copper suspended in a suitable vehicle, e.g., cellulose acetate. Other conventional techniques, such as electroplating or spraying, could also be used. Then the electrode support 10 is heated to a temperature above the melting point of copper, thus melting the powdered copper and causing it to run over the surface and form the thin coating 14 over the entire roughened surface. The vehicle vaporizes during the heating and is essentially eliminated. The purpose of this copper coating is to prevent the formation of a refractory oxide coating on the stainless steel during subsequent treatment at high temperature. Such a refractory oxide coating would undesirably interfere with bonding the tungsten to the stainless steel.

The copper coating 14 is very thin, preferably only about 0.1 mil in thickness. Since the depressions formed by the prior grit blasting operation typically have a depth many times this value, the roughness of the surface is largely unaffected by the thin layer of copper, as will be apparent from FIG. 2. In some cases, it may be desirable to lightly grit blast the copper surface to provide additional roughness.

After surface 12 has been thus prepared, the tungsten coating 25 is applied thereto by the previously described plasma arc spraying process. The sprayed tungsten coating interlocks with the projections on the base surface and thus forms a strong mechanical bond therewith. Spraying in continued until the desired thickness of coating is obtained. By way of example, in one application of the invention, the coatings were about 10 to 50 mils in thickness. The density, or porosity, of the sprayed coating can be controlled as desired to meet the requirements of a specific part.

The next step is to infiltrate the porous tungsten coating with a high conductivity metal such as copper. This is done by first applying copper to the surface of the sprayed coating, as by brushing a heavy coat of powdered copper onto the surface or by placing a suitable copper disc or shim on the surface.

The electrode support is then heated in a suitable reducing atmosphere such as hydrogen to a temperature above the melting point of copper, e.g., about 2,050° F. This melts the copper and causes the molten copper to flow through the porous tungsten coating, filling the pores and bonding the tungsten particles more intimately to each other and to the support 10 when the copper solidifies upon subsequent cooling.

After this infiltration has been completed, the part is cooled and is then lightly abraded, to smooth its surface and, incidently, to remove any excess copper remaining thereon.

Electrodes made in the above-described manner have successfully withstood severe bending and impact tests. The bond between the electrode 12 and the support 10 has been found to be stronger than the silver alloy brazed joints heretofore used for joining comparable electrodes to supports.

In one application of the invention, the electrode 10, 12 serves as one of the contacts of an electric circuit breaker (e.g., as the contact 78 of the circuit breaker shown in U.S. Pat. No. 2,911,546—Oppel). As such, it may be repeatedly driven into engagement with an opposing contact and separated from the opposing contact to draw an arc therebetween. It has been found that our electrode remains firmly bonded to its support despite the mechanical shocks of closing and despite the thermal shocks caused by the arc burning thereon during opening. No significant spalling or crumbling of the coating was observed despite these shocks.

Microscopic analysis has shown that there are very few voids in the material of our finished electrode, even in the immediate region of the bond to the electrodes support. This is in distinct contrast to the brazed joints heretofore used for joining refractory metal electrodes to the electrode support. Not infrequently, there are voids in such brazed joints where small amounts of the flux used in brazing might be trapped. When the root of the arc that is established on the electrode during circuit breaker operation heats the electrode, this trapped flux tends to vaporize and create internal pressures. This appears to be a major cause of the cracking that has sometimes been observed in such electrodes after arcing. Even if no flux is present in the void, the void is undesirable because it impedes efficient heat transfer from the electrode to the support, particularly if the electrode is relatively thin. This can be a significant problem in those electrodes which are exposed to high current arcs, where good heat transfer is needed to prevent localized heating of the electrode.

In contacts that are exposed to arcs, the elimination of brazing alloy is a significant advantage for still another reason. In this connection, the arc has a tendency to seek out any brazing alloy that is exposed, and the arc root tends to hang on the brazing alloy. This can interfere with the arc motion that is often desired and it can also result in excessive vaporization of contact material, particularly since the brazing alloy usually contains relatively volatile constituents. In a circuit breaker, either of these latter two factors can seriously detract from the current-interrupting ability of the circuit breaker.

Figure 3:
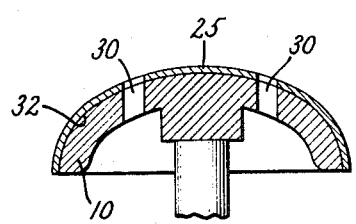
FIG. 3 is a cross-sectional view of an electrode structure of the prior art.

As an example of how the arc tends to seek out brazing alloy, assume that the electrode 25 is joined to its support 10 by brazing. Assume also that the electrode and support require holes therethrough, e.g., in order to permit air to pass therethrough. Such an electrode and support is depicted in FIG. 3 where the holes extending therethrough are shown at 30. The brazed joint between the electrode and support is indicated at 32. The holes are formed by drilling the electrode structure after the electrode has been brazed in place on its support. When an arc is established with its root or terminal on the exposed surface of the electrode, the arc root seems to be attracted to and to hang in one of the holes 30 where the brazed joint 32 is exposed. This interferes with the desired arc motion and produces excessive vaporization, as described above.

Figure 4:
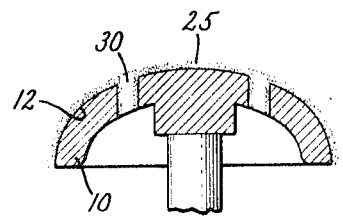
FIG. 4 is a cross-sectional view of electrode structure embodying one form of our invention.

In our electrode, we are able to overcome this problem, first of all, because we have no volatile brazing alloy to attract or hold the arc and, secondly, because we can coat the entire internal surface of the hole 30 with our sprayed tungsten coating 25. This is illustrated in FIG. 4 where the tungsten coating is shown extended into and covering or lining the internal surface of each hole 30, as well as the generally hemispherical surface 12. The portion of the coating 25 around the wall of hole 30 is also infiltrated with the high conductivity metal in the same manner as the rest of the coating 25.

It will be apparent that the above-described process of making the electrode structure required no special presses, no brazing operation, and no precise machining of the parts to fit them for brazing. Accordingly, electrode structures made by this process are much less expensive than the prior art electrode structure described in the introductory portion of this specification. Moreover, significantly improved electrical performance is obtainable with our electrodes, as was described hereinabove, since the volatile brazing alloys heretofore used have been eliminated.

The above-described manufacturing process has proven especially useful in making the type of electrodes that serve as the contacts of an electric circuit breaker. This is an especially demanding application since contacts are subjected not only to arcing but also to severe mechanical shocks when driven into impacting engagement at the end of the closing operation. In those applications where the electrode is not required to withstand such mechanical shocks, we have been able to obtain a satisfactory electrode by plasma spraying a combination of metal powders, e.g., tungsten and copper directly on to the roughened support surface. These powders are either mixed before entering the plasma stream or can be fed separately into the plasma stream. With this approach we can eliminate the subsequent infiltration operation described hereinabove.

In all of the above-described plasma spraying procedures, we have found that the addition of a small quantity of titanium hydride powder with the tungsten powdered being plasma sprayed, appears to result in improved bonding of the copper to the tungsten. The surface of the tungsten seems to be cleaner and more readily wetted by the copper.

Although we prefer to use tungsten as the refractory metal, it is to be understood that the invention in its broader aspects contemplates the use of other refractory materials instead, e.g., molybdenum.

While we have shown and described particular embodiments of our invention, it will be obvious to those skilled in the art that various changes and modifications may be made without departing from our invention in its broader aspects; and we, therefore, intend in the appended claims to cover all such changes and modifications as fall within the true spirit and scope of our invention.

What we claim as new and desire to secure by Letters Patent of the United States is:

We claim:

1. A method of making an impregnated refractory metal arcing contact for an electric circuit breaker and for joining the arcing contact to a metal support containing a hole therethrough, comprising:
   a. roughening the surface of the metal support,
   b. plasma arc spraying a refractory metal onto said surface including the internal surface of said hole to form a porous refractory metal coating interlocked with said surface and lining said hole,
   c. raising the temperature of said porous coating to a predetermined level,
   d. infiltrating said porous coating with a molten high conductivity metal thereby filling the pores of said coating with said molten metal,
   e. then cooling said coating to solidify the high conductivity metal in said pores.

2. The method of claim 1 in which the roughened surface of said support is coated prior to said spraying step with a thin layer of a metal that protects the metal of said support from oxidation during the high temperature infiltration step and is so thin that the exposed surface of the support including said coating remains roughened.

3. The method of claim 1 in which:
   a. said plasma spraying operation is effected by creating a plasma stream,
   b. said refractory metal is tungsten or molybdenum fed in powdered form into said plasma stream, and c. titanium hydride powder is mixed with said refractory metal powder.

4. The method of claim 3 in which said high conductivity metal is copper.

5. Contact structure for an electric circuit breaker in which electric arcs are established having one terminal on said contact structure, comprising:
   a. a metal support having a rough surface,
   b. a contact comprising a coating of plasma arc sprayed refractory metal bonded to said rough surface of said metal support,
   c. said coating comprising superimposed flattened and interlocking particles bonded together and forming a porous matrix and a high conductivity metal filling the pores of said matrix,
   d. the interface between said coating and said support being free of brazing metals having a lower melting point than said high conductivity metal,
   e. said contact structure having at least one hole extending through said support and said coating, said coating including an extension covering the internal area of said hole where the hole passes through said support.